US012577914B2

(12) United States Patent
Muldoon et al.

(10) Patent No.: US 12,577,914 B2
(45) Date of Patent: Mar. 17, 2026

(54) METHODS AND SYSTEMS FOR STARTING HYDROGEN POWERED GAS GENERATORS

(71) Applicant: RTX Corporation, Farmington, CT (US)

(72) Inventors: Marc J. Muldoon, Marlborough, CT (US); Carroll V. Sidwell, Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 136 days.

(21) Appl. No.: 18/144,576

(22) Filed: May 8, 2023

(65) Prior Publication Data

US 2024/0052782 A1 Feb. 15, 2024

Related U.S. Application Data

(63) Continuation of application No. 17/329,501, filed on May 25, 2021, now Pat. No. 11,668,243.

(51) Int. Cl.
| | |
|---|---|
| *F02C 7/224* | (2006.01) |
| *B64D 37/30* | (2006.01) |
| *B64D 37/34* | (2006.01) |
| *F02C 3/22* | (2006.01) |
| *F02C 7/26* | (2006.01) |

(Continued)

(52) U.S. Cl.
CPC .............. *F02C 7/224* (2013.01); *F02C 3/22* (2013.01); *F02C 7/26* (2013.01); *F02C 7/262* (2013.01); *F02C 9/40* (2013.01); *B64D 37/30* (2013.01); *B64D 37/34* (2013.01); *F05D 2220/323* (2013.01); *F05D 2240/36* (2013.01)

(58) Field of Classification Search
CPC ........................... F02C 3/22; F02C 7/22–236; F02C 7/26–277; F05D 2240/36; F05D 2260/85; F01D 19/00–02; F01D 25/10; B64D 37/00–34
See application file for complete search history.

(56) References Cited

U.S. PATENT DOCUMENTS

| | | | |
|---|---|---|---|
| 5,052,176 A | 10/1991 | Labatut et al. | |
| 5,069,031 A * | 12/1991 | Shekleton | F02C 7/262 |
| | | | 60/39.12 |

(Continued)

FOREIGN PATENT DOCUMENTS

| | | |
|---|---|---|
| WO | 2020079419 A1 | 4/2020 |
| WO | 2022023648 A1 | 2/2022 |

OTHER PUBLICATIONS

European Search Report for European Application No. 22174941.9; Date of Action: Oct. 18, 2022; 8 pages.

(Continued)

*Primary Examiner* — Stephanie Sebasco Cheng
(74) *Attorney, Agent, or Firm* — CANTOR COLBURN LLP

(57) ABSTRACT

Aircraft hydrogen fuel systems and methods and systems of starting such systems are described. The aircraft hydrogen fuel systems include a hydrogen burning main engine, a main tank configured to contain liquid hydrogen to be supplied to the main engine during a normal operation, and a starter tank configured to contain gaseous hydrogen to be used during a startup operation of the main engine. Methods and processes for starting and/or restarting such systems are described.

7 Claims, 6 Drawing Sheets

(51) Int. Cl.
   *F02C 7/262*     (2006.01)
   *F02C 9/40*      (2006.01)

(56) References Cited

U.S. PATENT DOCUMENTS

| 7,117,674  | B2   | 10/2006 | Sprouse et al.  |            |
|------------|------|---------|-----------------|------------|
| 8,549,862  | B2 * | 10/2013 | Kendrick        | F23R 3/286 |
|            |      |         |                 | 60/737     |
| 11,808,204 | B2 * | 11/2023 | Lambert         | F02C 3/22  |
| 11,828,232 | B2 * | 11/2023 | Carrotte        | F23R 3/283 |
| 11,859,539 | B2 * | 1/2024  | Rambo           | F02K 3/08  |
| 12,202,616 | B2 * | 1/2025  | Wang            | B64D 31/06 |
| 2014/0174083 | A1 |  6/2014 | Gerstler et al. |            |
| 2015/0344143 | A1 | 12/2015 | Epstein et al.  |            |
| 2022/0145801 | A1 * | 5/2022 | McCurdy Gibson  | F02C 3/22  |
| 2022/0220621 | A1 |  7/2022 | Morrison et al. |            |
| 2022/0381185 | A1 | 12/2022 | Muldoon et al.  |            |

OTHER PUBLICATIONS

European Office Action for EP Application No. 22174941.9, dated Dec. 2, 2024, pp. 1-6.

* cited by examiner

300

400

600

700

METHODS AND SYSTEMS FOR STARTING HYDROGEN POWERED GAS GENERATORS

CROSS REFERENCE TO RELATED APPLICATIONS

This application is a continuation of U.S. application Ser. No. 17/329,501 filed May 25, 2021, the entire contents of which are incorporated herein by reference thereto.

TECHNICAL FIELD

The present disclosure relates generally to turbine engines and aircraft engines, and more specifically to employing hydrogen fuel systems and related systems with turbine and aircraft engines.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section drives the compressor section to rotate. In some configurations, a fan is also connected to the shaft and is driven to rotate via rotation of the turbine.

Typically, liquid fuel is employed for combustion onboard an aircraft, in the gas turbine engine. The liquid fuel has conventionally been a hydrocarbon-based fuel. Alternative fuels have been considered, but suffer from various challenges for implementation, particularly on aircraft. Hydrogen-based and/or methane-based fuels are viable effective alternatives which may not generate the same combustion byproducts as conventional hydrocarbon-based fuels. Improved systems using the same may be desirable.

BRIEF SUMMARY

According to some embodiments, aircraft hydrogen fuel systems are provided. The aircraft hydrogen fuel systems include a hydrogen burning main engine, a main tank configured to contain liquid hydrogen to be supplied to the main engine during a normal operation, and a starter tank configured to contain gaseous hydrogen to be used during a startup operation of the main engine.

In addition to one or more of the features described above, or as an alternative, embodiments of the aircraft hydrogen fuel systems may include that the starter tank is manually exchangeable.

In addition to one or more of the features described above, or as an alternative, embodiments of the aircraft hydrogen fuel systems may include that the starter tank is refillable.

In addition to one or more of the features described above, or as an alternative, embodiments of the aircraft hydrogen fuel systems may include that the main engine generates waste heat during the normal operation and the waste heat is used to convert the liquid hydrogen to gaseous hydrogen during the normal operation within a main engine fuel conditioning heat exchanger.

In addition to one or more of the features described above, or as an alternative, embodiments of the aircraft hydrogen fuel systems may include that the starter tank is at least partially supplied with gaseous hydrogen from boil-off from the main tank.

In addition to one or more of the features described above, or as an alternative, embodiments of the aircraft hydrogen fuel systems may include an accumulator arranged between the main tank and the starter tank, the accumulator configured to accumulate the gaseous hydrogen from boil-off.

In addition to one or more of the features described above, or as an alternative, embodiments of the aircraft hydrogen fuel systems may include a pump configured to boost a pressure of the gaseous hydrogen from boil-off prior to being supplied into the starter tank.

In addition to one or more of the features described above, or as an alternative, embodiments of the aircraft hydrogen fuel systems may include an auxiliary power unit configured to heat the liquid hydrogen to generate gaseous hydrogen to be supplied to the main engine, wherein the auxiliary power unit includes an APU fuel conditioning heat exchanger.

In addition to one or more of the features described above, or as an alternative, embodiments of the aircraft hydrogen fuel systems may include that the auxiliary power unit is a hydrogen burning unit.

In addition to one or more of the features described above, or as an alternative, embodiments of the aircraft hydrogen fuel systems may include that the auxiliary power unit is supplied with gaseous hydrogen from the starter tank during a startup operation of the auxiliary power unit.

In addition to one or more of the features described above, or as an alternative, embodiments of the aircraft hydrogen fuel systems may include that the auxiliary power unit is supplied with gaseous hydrogen from the main tank during a normal operation of the auxiliary power unit, wherein a waste heat of the auxiliary power unit is used to convert the liquid hydrogen to gaseous hydrogen.

In addition to one or more of the features described above, or as an alternative, embodiments of the aircraft hydrogen fuel systems may include that the starter tank is configured to supply gaseous hydrogen to the auxiliary power unit during a startup operation of the auxiliary power unit and waste heat of the started auxiliary power unit is used to heat hydrogen from the main tank to be supplied to the main engine during the normal operation.

In addition to one or more of the features described above, or as an alternative, embodiments of the aircraft hydrogen fuel systems may include that gaseous hydrogen from the starter tank is supplied to the main engine to perform a restart operation in the event of a flame-out occurrence in the main engine.

In addition to one or more of the features described above, or as an alternative, embodiments of the aircraft hydrogen fuel systems may include a valve arranged along a hydrogen flow path between the main tank and the main engine.

In addition to one or more of the features described above, or as an alternative, embodiments of the aircraft hydrogen fuel systems may include that the main engine includes a compressor section, a combustor section having a burner, and a turbine section, wherein the combustor is configured to burn hydrogen fuel.

According to some embodiments, methods of performing a startup operation of a hydrogen burning turbine engine are provided. The methods include supplying gaseous hydrogen to a main engine to perform a startup operation, the gaseous hydrogen supplied from a starter tank and after the main engine is started, switching a supply of hydrogen fuel from the starter tank to a main tank, wherein the main tank stores liquid hydrogen and wherein the liquid hydrogen is converted to gaseous hydrogen using waste heat generated by the main engine during a normal operation.

In addition to one or more of the features described above, or as an alternative, embodiments of the startup methods may include supplying gaseous hydrogen from the starter tank to a hydrogen burning auxiliary power unit to perform a startup operation of the auxiliary power unit.

In addition to one or more of the features described above, or as an alternative, embodiments of the startup methods may include capturing boil-off gaseous hydrogen from the main tank and supplying said captured boil-off gaseous hydrogen to at least one of the main engine and the starter tank.

In addition to one or more of the features described above, or as an alternative, embodiments of the startup methods may include supplying gaseous hydrogen from the starter tank to the main engine in response to a flame-off event of the main engine.

According to some embodiments, methods of performing a startup operation of a hydrogen burning turbine engine are provided. The methods include supplying gaseous hydrogen to a hydrogen burning auxiliary power unit to perform a startup operation of the auxiliary power unit, the gaseous hydrogen supplied from a starter tank. After the auxiliary power unit is started, the methods include switching a supply of hydrogen fuel from the starter tank to a main tank, wherein the main tank stores liquid hydrogen and wherein the liquid hydrogen is converted to gaseous hydrogen using waste heat generated by the auxiliary power unit during a normal operation. The method further includes passing liquid hydrogen from the main tank through an auxiliary power unit heat exchanger to convert the liquid hydrogen to gaseous hydrogen and supplying said gaseous hydrogen to a hydrogen burning main engine for performing a startup operation of the main engine.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
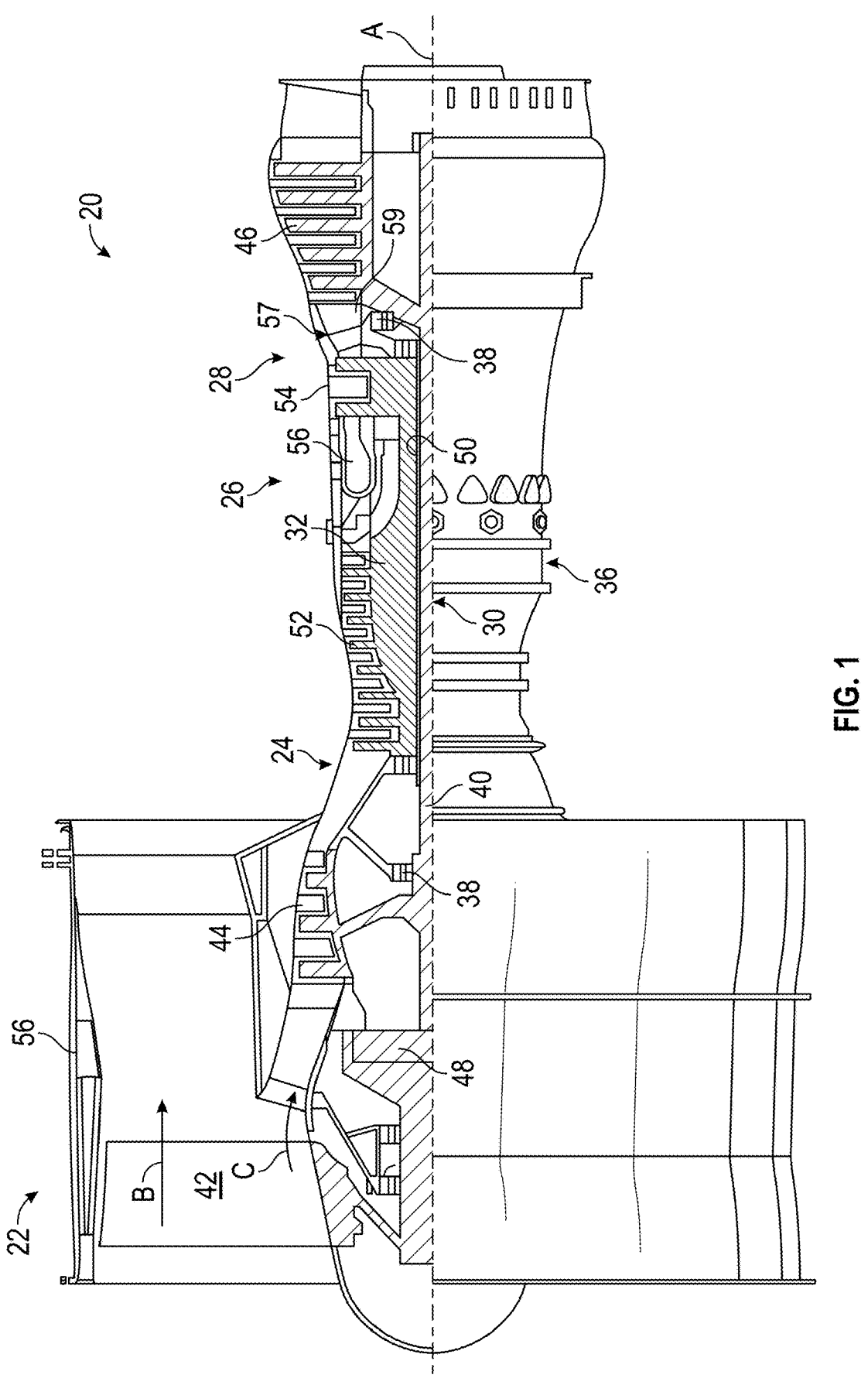
FIG. 1 is a schematic cross-sectional illustration of a gas turbine engine architecture that may employ various embodiments disclosed herein.

FIG. 1 schematically illustrates a gas turbine engine 20. As illustratively shown, the gas turbine engine 20 is configured as a two-spool turbofan that has a fan section 22, a compressor section 24, a combustor section 26, and a turbine section 28. The illustrative gas turbine engine 20 is merely for example and discussion purposes, and those of skill in the art will appreciate that alternative configurations of gas turbine engines may employ embodiments of the present disclosure. The fan section 22 includes a fan 42 that is configured to drive air along a bypass flow path B in a bypass duct defined in a fan case 15. The fan 42 is also configured to drive air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

In this two-spool configuration, the gas turbine engine 20 includes a low speed spool 30 and a high speed spool 32 mounted for rotation about an engine central longitudinal axis A relative to an engine static structure 36 via one or more bearing systems 38. It should be understood that various bearing systems 38 at various locations may be provided, and the location of bearing systems 38 may be varied as appropriate to a particular application and/or engine configuration.

The low speed spool 30 includes an inner shaft 40 that interconnects the fan 42 of the fan section 22, a first (or low) pressure compressor 44, and a first (or low) pressure turbine 46. The inner shaft 40 is connected to the fan 42 through a speed change mechanism, which, in this illustrative gas turbine engine 20, is as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the combustor section 26 between the high pressure compressor 52 and the high pressure turbine 54. A mid-turbine frame 57 of the engine static structure 36 is arranged between the high pressure turbine 54 and the low pressure turbine 46. The mid-turbine frame 57 may be configured to support one or more of the bearing systems 38 in the turbine section 28. The inner shaft 40 and the outer shaft 50 are concentric and rotate via the bearing systems 38 about the engine central longitudinal axis A which is collinear with their longitudinal axes.

The core airflow through core airflow path C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 (e.g., vanes) which are arranged in the core airflow path C. The turbines 46, 54 rotationally drive the respective low speed spool 30 and high speed spool 32 in response to the expansion of the core airflow.

It will be appreciated that each of the positions of the fan section 22, the compressor section 24, the combustor section 26, the turbine section 28, and geared architecture 48 or other fan drive gear system may be varied. For example, in some embodiments, the geared architecture 48 may be located aft of the combustor section 26 or even aft of the turbine section 28, and the fan section 22 may be positioned forward or aft of the location of the geared architecture 48.

The gas turbine engine 20 in one example is a high-bypass geared aircraft engine. In some such examples, the engine 20 has a bypass ratio that is greater than about six (6), with an example embodiment being greater than about ten (10). In some embodiments, the geared architecture 48 is an epicyclic gear train, such as a planetary gear system or other gear system, with a gear reduction ratio of greater than about 2.3 and the low pressure turbine 46 has a pressure ratio that is greater than about five (5). In one non-limiting embodiment, the bypass ratio of the gas turbine engine 20 is greater than about ten (10:1), a diameter of the fan 42 is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle. In some embodiments, the geared architecture 48 may be an epicycle gear train, such as a planetary gear system or other gear system, with a gear reduction ratio of greater than about 2.3:1. It should be understood, however, that the above parameters are only for example and explanatory of one non-limiting embodiment of a geared architecture engine and that the present disclosure is applicable to other gas turbine engines including turbojets or direct drive turbofans, turboshafts, or turboprops.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Gas turbine engines generate substantial amounts of heat that is exhausted from the turbine section 28 into a surrounding atmosphere. This expelled exhaust heat represents wasted energy and can be a source of inefficiency in gas turbine engines. Further, transitioning away from hydrocarbon-based engines may be significant advantages, as described herein.

Figure 2:
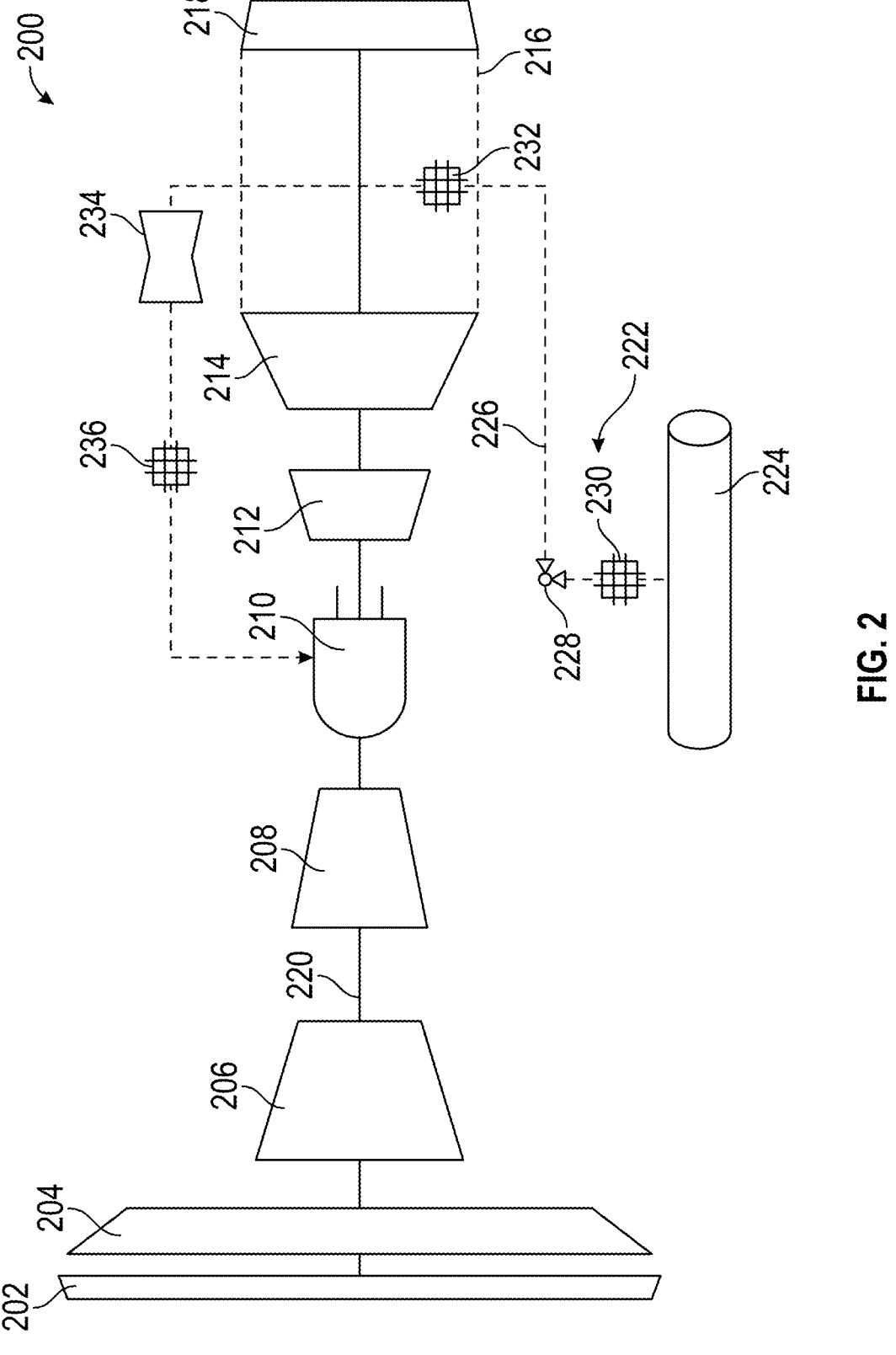
FIG. 2 is a schematic illustration of a turbine engine system in accordance with an embodiment of the present disclosure that employs a non-hydrocarbon fuel source.

Turning now to FIG. 2, a schematic diagram of a turbine engine system 200 in accordance with an embodiment of the present disclosure is shown. The turbine engine system 200 may be similar to that shown and described above but is configured to employ a non-hydrocarbon fuel source, such as liquid/compressed/supercritical hydrogen. The turbine engine system 200 includes an inlet 202, a fan 204, a low pressure compressor 206, a high pressure compressor 208, a combustor 210, a high pressure turbine 212, a low pressure turbine 214, a core nozzle 216, and an outlet 218. A core flow path is defined through, at least, the compressor 206, 208, the turbine 212, 214, and the combustor sections 210. The compressor 206, 208, the turbine 212, 214, and the fan 204 are arranged along a shaft 220.

As shown, the turbine engine system 200 includes a hydrogen fuel system 222. The hydrogen fuel system 222 is configured to supply a hydrogen fuel from a hydrogen fuel tank 224 to the combustor 210 for combustion thereof. In this illustrative embodiment, the hydrogen fuel may be supplied from the hydrogen fuel tank 224 to the combustor 210 through a fuel supply line 226. The fuel supply line 226 may be controlled by a flow controller 228 (e.g., pump(s), valve(s), or the like). The flow controller 228 may be configured to control a flow through the fuel supply line 226 based on various criteria as will be appreciated by those of skill in the art. For example, various control criteria can include, without limitation, target flow rates, target turbine output, cooling demands at one or more heat exchangers, target flight envelopes, etc. As shown, between the cryogenic fuel tank 222 and the flow controller 228 may be one or more heat exchangers 230, which can be configured to provide cooling to various systems onboard an aircraft by using the hydrogen as a cold-sink. Such hydrogen cold-sink heat exchangers 230 may be configured to warm the hydrogen and aid in a transition from a liquid state to a gaseous state for combustion within the combustor 210. The heat exchangers 230 may receive the hydrogen fuel directly from the hydrogen fuel tank 222 as a first working fluid and a component-working fluid for a different onboard system. For example, the heat exchanger 230 may be configured to provide cooling to power electronics of the turbine engine system 200 (or other aircraft power electronics). This may serve, in some configurations, to begin raising a temperature of the hydrogen fuel to a desired temperature for efficient combustion in the combustor 210.

When the hydrogen is directed along the flow supply line 226, the hydrogen can pass through a core flow path heat exchanger 232 (e.g., an exhaust waste heat recovery heat exchanger) or other type of heat exchanger. In this embodiment, the core flow path heat exchanger 232 is arranged in the core flow path downstream of the combustor 210, and in some embodiments, downstream of the low pressure turbine 214. In this illustrative embodiment, the core flow path heat exchanger 232 is arranged downstream of the low pressure turbine 214 and at or proximate the core nozzle 216 upstream of the outlet 218. As the hydrogen passes through the core flow path heat exchanger 232, the hydrogen will pick up heat from the exhaust of the turbine engine system 200. As such, the temperature of the hydrogen will be increased.

The heated hydrogen may then be passed into an expansion turbine 234. As the hydrogen passes through the expansion turbine 234 the hydrogen will be expanded. The process of passing the hydrogen through the expansion turbine 234 can cause a phase change from liquid to gas and/or further expand the hydrogen, which is aided by one or more heat exchangers along the fuel supply line 226. The expanded hydrogen may then pass through an optional supplemental heating heat exchanger 236. The supplemental heating heat exchanger 236 may be configured to receive the heated (but potentially still relatively cold) hydrogen as a first working fluid and as the second working fluid may receive one or more aircraft system fluids, such as, without limitation, engine oil, environmental control system fluids, pneumatic off-takes, or cooled cooling air fluids. As such, the hydrogen will be heated, and the other fluid may be cooled.

The hydrogen will then be injected into the combustor 210 through one or more hydrogen injectors, as will be appreciated by those of skill in the art. Because the hydrogen is heated from a cryogenic or liquid state in the hydrogen fuel tank 224 through the various mechanisms along the flow supply line 226, combustion efficiency may be improved.

Due to climate concerns, a variety of reduced-emissions alternatives to petroleum-based fuel are being widely investigated throughout the aviation industry, including the above described hydrogen-burning system. Hydrogen is an advantageous choice due to zero carbon emissions from combustion processes associated with burning hydrogen. However, the low volumetric energy density of hydrogen may pose packaging challenges for aviation applications, such as weight and volume considerations for sufficient fuel for flight operations. In order to mitigate this issue, it is desirable to store the hydrogen fuel on the aircraft in liquid form to improve energy density and then convert to a gaseous state for the combustion process (e.g., along the fuel supply line 226 from the hydrogen fuel tank 224 to the combustor 210). As such, the liquid hydrogen ($LH_2$) may be stored in insulated tanks. In the insulated tanks, the hydrogen may be stored at approximately −415° F. to −430° F. These temperatures can ensure that the hydrogen remains liquid at approximately 1 atm pressure in order to avoid the need for heavier tanks designed for high pressure. Prior to combustion the $LH_2$ must then be heated to approximately −150° F. or higher. To achieve such temperatures, as described above, heat from the engines and aircraft components may be employed along the fuel supply line. Two of the challenges associated with this arrangement are the issue of starting (e.g., ignition) prior to having a heat source and limiting losses from boil-off of the $LH_2$ from the insulated storage tanks.

Embodiments of the present disclosure are directed to methods and systems for normal and emergency starting (e.g., ignition) as well as mitigation for tank boil-off from hydrogen storage tanks. Substantial energy may be required to heat up the low temperature $LH_2$ (e.g., −415° F. to −430° F.) to the temperatures necessary for combustion (e.g., above −150° F.). Using combustion waste heat is an efficient method for heating the hydrogen, but the combustion waste heat is not available prior to start (ignition).

Embodiments of the present disclosure are directed to methods and systems for performing starting operations of a hydrogen burning engine. For example, in accordance with one non-limiting embodiment, a dedicated, pressurized gaseous hydrogen ($GH_2$) tank may be used to supply gaseous hydrogen to start one or more engines (e.g., $H_2$-burning auxiliary power unit(s) ("APU") and main engine(s)). After starting, waste heat can be generated from the engine, and the gaseous hydrogen for combustion will be switched a supply from an $LH_2$ main tank. It may be desirable to minimize the volume of the dedicated $GH_2$ starting tank because a gaseous hydrogen tank will be heavier by volume than the $LH_2$ main tanks. In accordance with some embodiments, it is proposed to use a relatively small $GH_2$ starter tank to start an APU, and the exhaust stream of the APU would be used to heat liquid hydrogen supplied from an $LH_2$ main tank to then start the main engine(s). A flow of hydrogen supplied to the main engine(s) may be controlled by a valve, pump, flow controller, or other actuator that may be actuated by an aircraft control system. The aircraft control system can be configured to monitor for a combustor flame-out indication to actuate a flow controller to determine a source of hydrogen supplied to a burner. For example, the aircraft control system may be configured to change fuel flow from an $LH_2$ main tank to be sourced, instead, form an APU that includes a heat exchanger for heating the hydrogen into gaseous form. In some embodiments, in-flight re-start in the event of a combustor blow-out of the main engine(s) may be achieved using either a dedicated $GH_2$ tank and/or heating of liquid hydrogen using waste heat from an APU.

Furthermore, in accordance with embodiments of the present disclosure, boil-off venting from the $LH_2$ main tank(s) may be necessary because some portion of the liquid hydrogen fuel will be exposed to temperatures above a vapor temperature, especially along the walls of the tank(s) and on hot days. In order to efficiently re-purpose this vented gas, embodiments of the present disclosure are directed to collecting the boil-off hydrogen (in gaseous form) in an accumulator or holding tank and using this gaseous form of hydrogen for starting and/or re-start operations when the gas pressure requirements are only a few psi above ambient. In some embodiments, a sensor can be provided to monitor an accumulator pressure and a low-power pump could be used to pump the boiled off hydrogen to a dedicated $GH_2$ starting tank.

Figure 3:
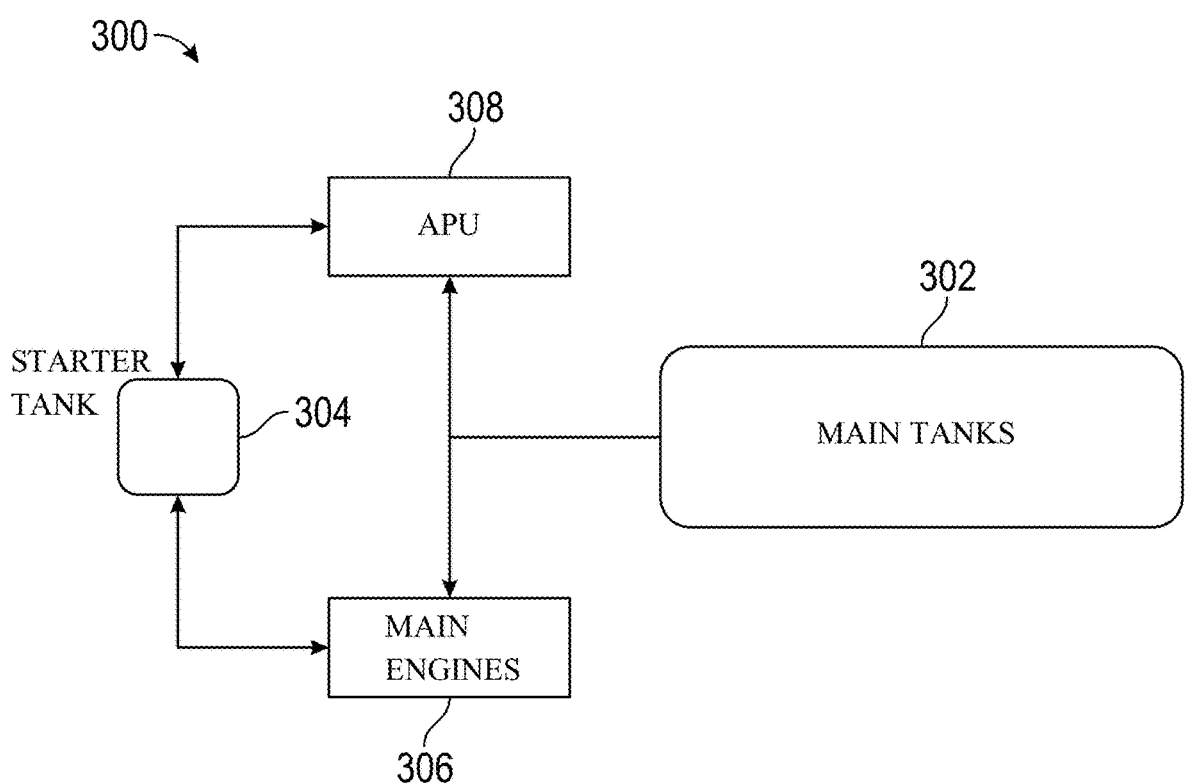
FIG. 3 is a schematic diagram of an aircraft fuel system in accordance with an embodiment of the present disclosure.

Turning now to FIG. 3, a schematic diagram of an aircraft fuel system 300 is shown. The aircraft fuel system 300 may be a hydrogen-based system that employs hydrogen as a combustible fuel to be burned within a burner or combustor to drive rotation of a turbine, such as shown and described above. The aircraft fuel system 300 is schematically shown, and various components and elements of an aircraft and/or engine are not shown for simplicity and explanatory purposes. However, the aircraft fuel system 300 may be implemented with the engine systems shown and described above.

The aircraft fuel system 300 includes one or more $LH_2$ main tanks 302, one or more $GH_2$ starter tanks 304, one or more main engines 306, and one or more APUs 308. During a starting operation (e.g., from an off-state to an on-state), the aircraft fuel system 300 may be configured to supply gaseous hydrogen from the $GH_2$ starter tank 304 the APUs 308 and/or the main engines 306. In some embodiments, the gaseous hydrogen may be supplied to each of the APUs 308 and main engines 306 and a light-off or start-up operation is performed to ignite the gaseous fuel and begin the combustion cycle. Once the engine(s) 306, 308 are operational, the supply from the $GH_2$ starter tank 304 may be stopped and liquid hydrogen may be sourced from the $LH_2$. Because the engines 306, 308 are operational, they will begin generating heat, and one or more heat exchangers may be used to warm the liquid hydrogen to cause it to change phase to a gaseous state along a flow path from the $LH_2$ main tanks 302 to the respective engines 306, 308.

Figure 4:
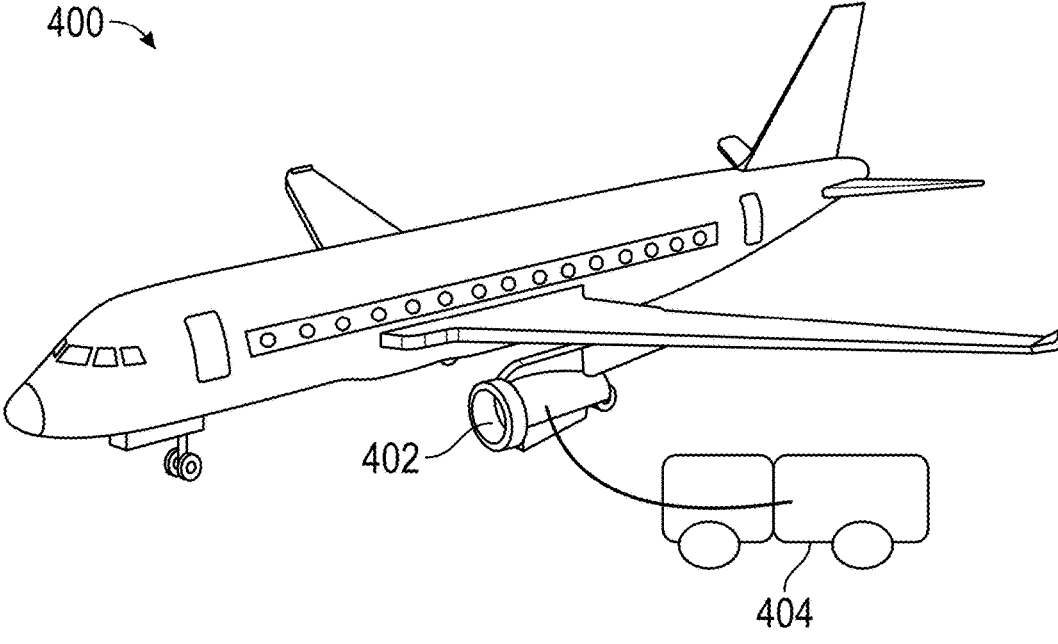
FIG. 4 is a schematic illustration of an aircraft in accordance with an embodiment of the present disclosure.

Turning to FIG. 4, an aircraft 400 having a hydrogen burning engine 402 is illustratively shown. In this configuration, the aircraft 400 may include one or more hydrogen burning engines 402. The hydrogen burning engines 402 may be provided with hydrogen sourced from an $LH_2$ main tank, as described above, but may not include an onboard supply of gaseous hydrogen for the purposes of starting the hydrogen burning engines 402. As such, in this embodiment, when the aircraft 400 is on the ground, a ground supply vehicle 404 may be provided to supply gaseous hydrogen from the ground supply vehicle 404 directly to the hydrogen burning engines 402 for the purpose of ignition and starting of the hydrogen burning engines 402. After the hydrogen burning engines 402 are started, the ground supply vehicle 404 may be detached from the aircraft 400, and the supply of hydrogen may be changed from the ground supply vehicle 404 to an onboard LH₂ main tank.

Figure 5:
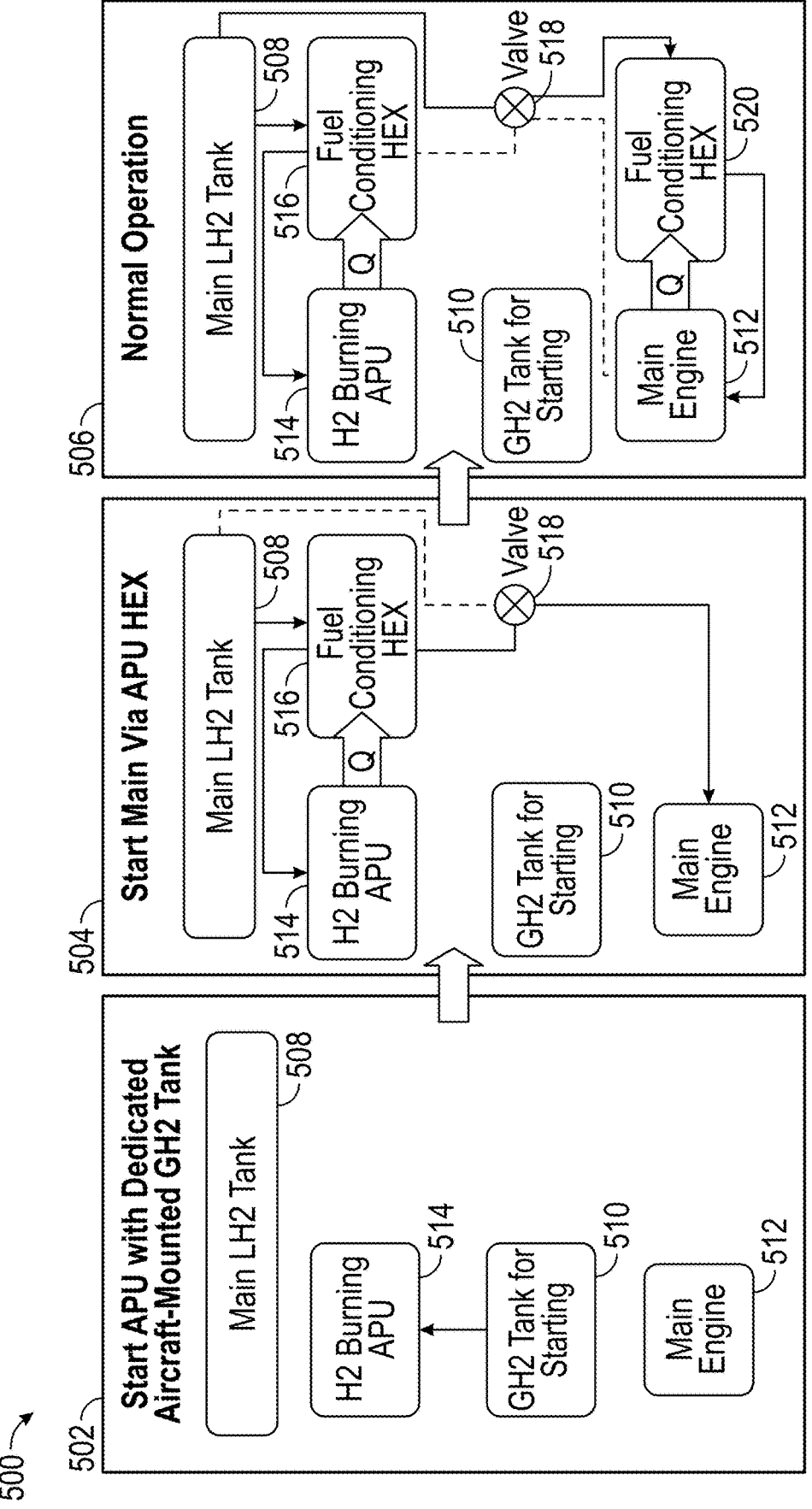
FIG. 5 is a schematic flow process for performing a startup operation of a hydrogen burning main engine onboard an aircraft in accordance with an embodiment of the present disclosure.

Turning now to FIG. 5, a schematic flow process 500 for performing a startup operation of a hydrogen burning main engine onboard an aircraft is shown. In the configuration of the schematic flow process 500, an aircraft having an LH₂ main tank 508 and a GH₂ starter tank 510 is illustrated during the process from an off-state (block 502), through a start-up process (block 502 to block 504) and then normal operation (block 506). For power, the aircraft includes a hydrogen burning main engine 512 and a hydrogen burning auxiliary power unit APU 514.

At block 502, gaseous hydrogen is supplied from the GH₂ starter tank 510 to the APU 514. The gaseous hydrogen is used to perform a light-off and start combustion or burning within the APU 514. This burning within the APU 514 will generate heat. Once the APU 514 is operational, the supply of hydrogen from the GH₂ starter tank 510 is stopped and a supply of liquid hydrogen is provided from the LH₂ main tank 508, which is converted into gaseous form using the heat generated by the APU 514, as illustratively shown at block 504.

At block 504, liquid hydrogen is supplied from the LH₂ main tank 508 into an APU fuel conditioning heat exchanger 516, which may be part of the APU 514. The APU fuel conditioning heat exchanger 516 may be arranged to recover and use waste heat generated by hydrogen combustion within the APU 514. As the temperature is now sufficient for converting liquid hydrogen to gaseous hydrogen, a supply of hydrogen fuel may be supplied from the LH₂ main tank 508 to the main engine 512, with the heat provided from the APU fuel conditioning heat exchanger 516. This gaseous hydrogen may then be used to start up the main engine 512. As shown, a valve 518 may be configured to control the fuel flow path from the LH₂ main tank 508 to the main engine 512. At block 504, the valve 518 is actuated, oriented, or otherwise controlled to supply gaseous hydrogen from the LH₂ main tank 508, through the APU fuel conditioning heat exchanger 516, and to the main engine 512 for combustion therein.

At block 506, with the main engine 512 operational and burning hydrogen, the valve 518 may be controlled to direct liquid hydrogen from the LH₂ main tank 508 to a main engine fuel conditioning heat exchanger 520 to convert the liquid hydrogen to gaseous hydrogen. As shown in block 506, hydrogen from the LH₂ main tank 508 may be supplied to each of the APU 514 and the main engine 512 through the respective fuel conditioning heat exchangers 516, 520. In the case that the main engine 512 has a burn out event, the valve 518 may be controlled to redirect gaseous hydrogen from the APU fuel conditioning heat exchanger 516 to the main engine 512, to perform a restart operation (illustrated as the dashed line path in block 506).

Figure 6:
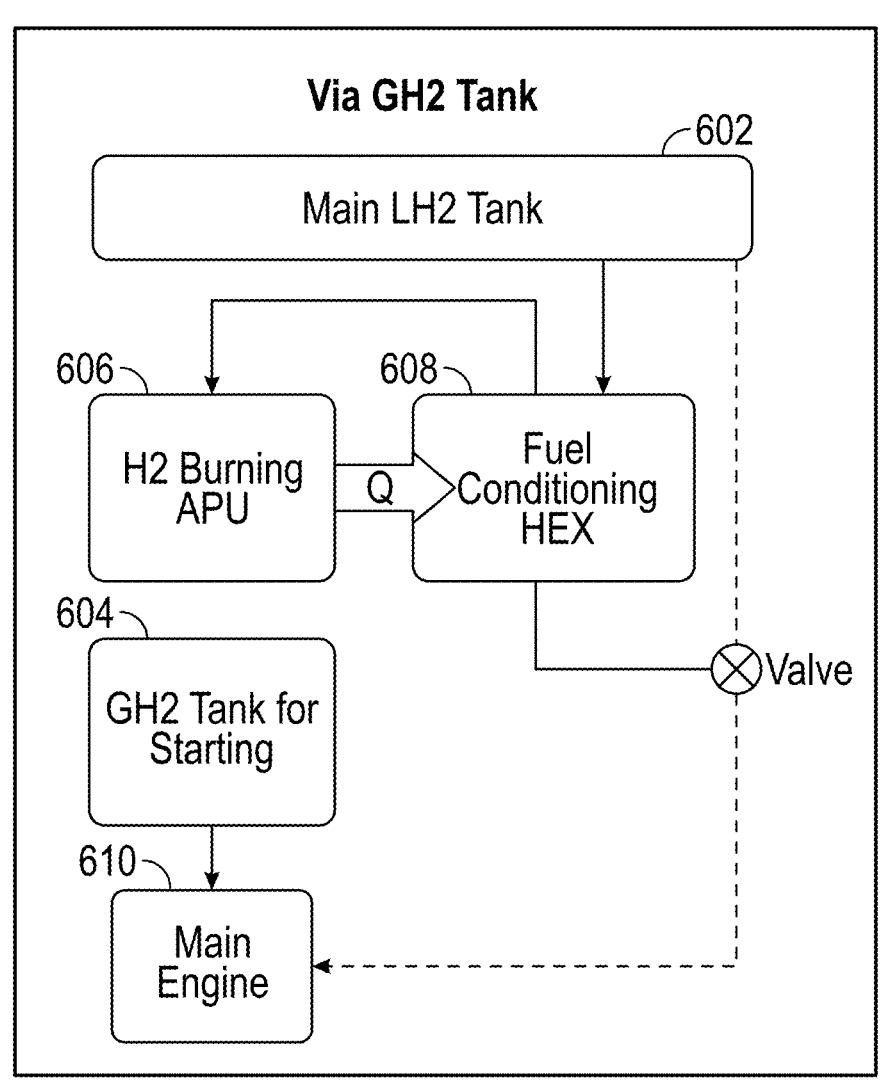
FIG. 6 is a schematic diagram of a restart operation in accordance with an embodiment of the present disclosure.

Turning to FIG. 6, an alternative restart operation in accordance with an embodiment of the present disclosure is shown. In the schematic flow process 500, and particularly block 506, a restart operation uses excess heat from the APU 514 to convert liquid hydrogen to gaseous form and use the gaseous hydrogen to restart the main engine 512. In FIG. 6, an aircraft fuel system 600 includes an LH₂ main tank 602, a GH₂ starter tank 604, a hydrogen burning APU 606, an associated APU fuel conditioning heat exchanger 608, and a main engine 610. In this configuration, although during normal operation the main engine 610 may be supplied with hydrogen from the LH₂ main tank 602, if the main engine 610 has a blowout event, gaseous hydrogen may be supplied from the GH₂ starter tank 604.

In the above described embodiments, the gaseous hydrogen for starting an APU and/or main engine is supplied from a dedicated gaseous hydrogen supply tank (GH₂ start tanks). The gaseous hydrogen supply tanks of the present disclosure may be discrete tanks that can be installed in an as-needed basis, such as when the aircraft is on the ground. The gaseous hydrogen supply tanks may be refillable or may be manually exchangeable.

In the refillable cases, the gaseous hydrogen supply tank may be filled from a ground source (e.g., a ground supply vehicle or the like). Further, in some embodiments, the gaseous hydrogen within the gaseous hydrogen supply tanks may be supplied, at least in part, from boil off from the LH₂ main tank(s) onboard the aircraft.

Figure 7:
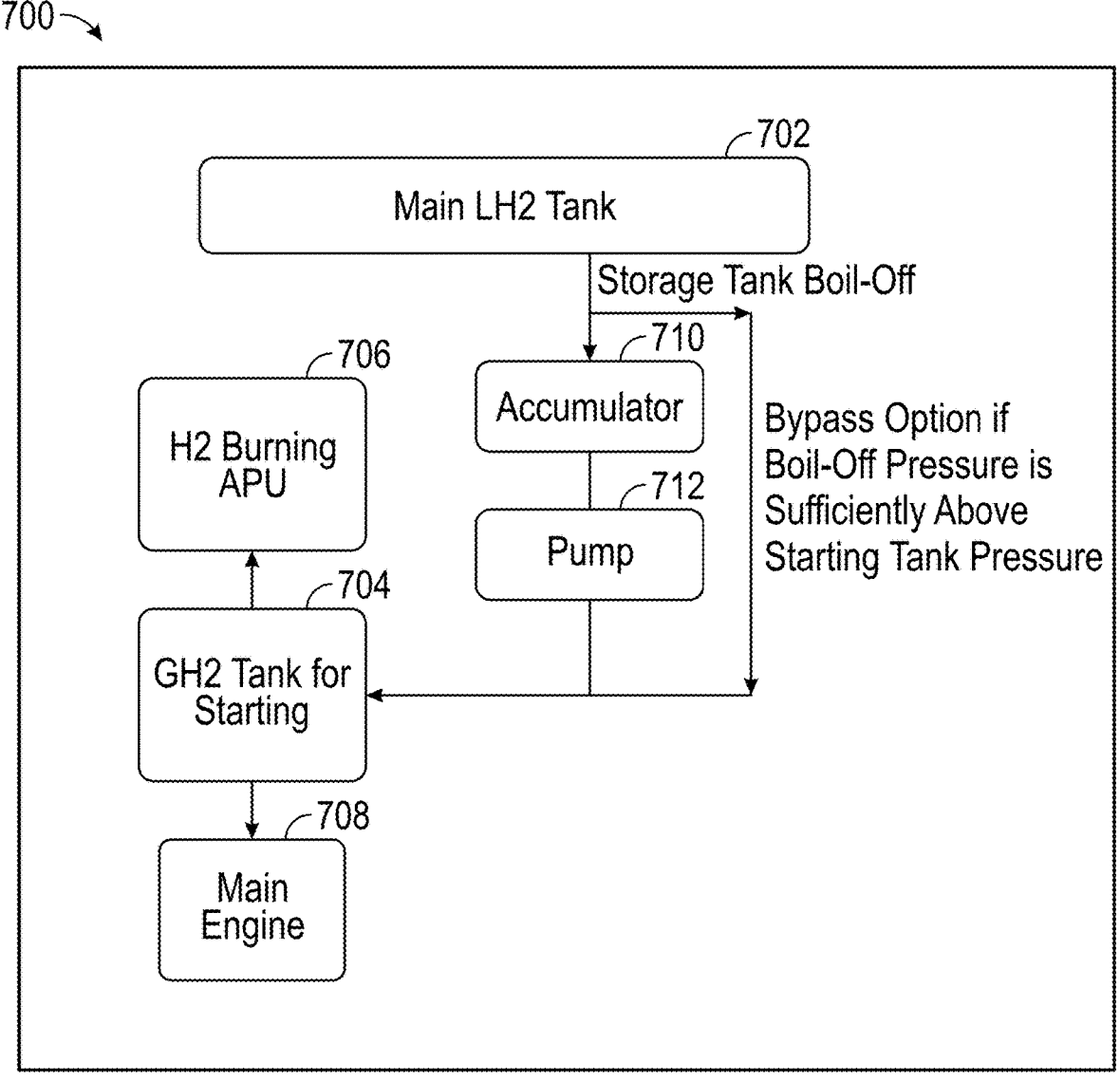
FIG. 7 is a schematic diagram of a restart operation in accordance with an embodiment of the present disclosure.

For example, turbine to FIG. 7, a schematic diagram of an aircraft fuel system 700 in accordance with an embodiment of the present disclosure is shown. The aircraft fuel system 700 includes an LH₂ main tank 702, a GH₂ starter tank 704, a hydrogen burning APU 706, and a hydrogen burning main engine 708. In this configuration, the GH₂ starter tank 704 is supplied with gaseous hydrogen from the LH₂ main tank 702. For example, the gas form of hydrogen may be a boil-off of the liquid hydrogen contained within the LH₂ main tank 702. It will be appreciated that this configuration may be used with a refillable and/or exchangeable GH₂ starter tank, as described above, and thus the boil-off hydrogen from the LH₂ main tank 702 may not be the only source of gaseous hydrogen for the GH₂ starter tank 704. That is, in some configuration, the boil-off gaseous hydrogen may be used to supplement a GH₂ starter tank.

In some such embodiments, the boil-off hydrogen gas may be captured within an accumulator 710, such as a temporary storage tank, ullage of the LH₂ main tank 702, or even a section of a supply or feed line from the LH₂ main tank 702 to the GH₂ starter tank 704. Because the boil-off gas may be relatively low pressure, a pump 712 may be provided to boost a pressure of the collected boil-off hydrogen gas prior to supplying the gaseous hydrogen into the GH₂ starter tank 704. It will be appreciated that in some embodiments, a supply line that includes an accumulator may be configured to direct the collected gaseous boil-off hydrogen directly to one or both of the APU 706 and/or the main engine 708, and thus may not be stored. Such operation may be used when the aircraft is in flight and the boil-off hydrogen will not be wasted (whether stored in the GH₂ starter tank 704 or supplied directly into a burner).

In accordance with some embodiments of the present disclosure, liquid hydrogen stored in main tanks may be stored at, for example and without limitation, pressures that are roughly ambient pressures (e.g., about 20 psi). Further, in accordance with some embodiments of the present disclosure, gaseous hydrogen stored in starter tanks may be stored at significantly higher pressures than ambient (e.g., 5-10K psi). Additionally, in embodiments that employ a boil-off capture system, the boil-off gaseous hydrogen may be stored at, for example and without limitation, pressures above ambient and may be boosted using a boost pump or the like.

Advantageously, embodiments of the present disclosure are directed to improved hydrogen fuel systems for aircraft. In accordance with some embodiments, the systems described herein provide for one or more hydrogen-burning engines (e.g., APUs and/or main engines) that may be supplied with gaseous hydrogen from a dedicated gaseous hydrogen tank to supplement a liquid hydrogen tank. The dual-tank configuration of embodiments of the present disclosure enables starting of hydrogen burning engines using a hydrogen fuel source in combination with a liquid hydrogen fuel tank for normal operation. Such configurations provide for a weight-efficient and volume-efficient means of supplying gaseous hydrogen into the engines to start the engines, and then a switch can be made to a liquid hydrogen fuel source when waste heat is available to convert the liquid hydrogen to gaseous hydrogen. Further, advantageously, embodiments of the present disclosure enable a redundancy of starting methods in the event of combustor flame-out. Furthermore, an efficient means of utilizing boil-off gaseous hydrogen from liquid hydrogen tanks is disclosed.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. A method of performing a startup operation of a hydrogen-burning turbine engine, the method comprising:

controlling a valve to supply liquid hydrogen from a fuel supply to a first hydrogen-burning turbine engine to convert the liquid hydrogen to gaseous hydrogen in a first fuel conditioning heat exchanger using waste heat generated by the first hydrogen-burning turbine engine and combusting the gaseous hydrogen in the first hydrogen-burning turbine engine during a normal operation;

determining that the first hydrogen-burning turbine engine has a combustor flame-out condition;

upon determining the first hydrogen-burning turbine engine has the combustor flame-out condition, controlling the valve to stop supplying the liquid hydrogen to the first hydrogen-burning turbine engine and to route the liquid hydrogen from the fuel supply to a second hydrogen-burning engine, wherein a second fuel conditioning heat exchanger of the second hydrogen-burning engine is configured to convert the liquid hydrogen to gaseous hydrogen;

supplying the gaseous hydrogen to the first hydrogen-burning turbine engine from the second fuel conditioning heat exchanger to perform the startup operation via combustion of the gaseous hydrogen within the first hydrogen-burning turbine engine; and after the first hydrogen-burning turbine engine is started and returned to the normal operation, controlling the valve to redirect the liquid hydrogen from the fuel supply to the first hydrogen-burning turbine engine to convert the liquid hydrogen to gaseous hydrogen in the first fuel conditioning heat exchanger using the waste heat generated by the first hydrogen-burning turbine engine during the normal operation.

2. The method of claim 1, further comprising supplying gaseous hydrogen from a starter tank to the second hydrogen-burning engine to perform a startup operation of the second hydrogen-burning engine.

3. The method of claim 1, further comprising capturing boil-off gaseous hydrogen from the fuel supply and supplying said captured boil-off gaseous hydrogen to at least one of the first hydrogen-burning turbine engine and a starter tank.

4. The method of claim 1, further comprising supplying gaseous hydrogen from a starter tank to the first hydrogen-burning turbine engine in response to determining that the first hydrogen burning turbine engine has the combustor flame-out condition.

5. The method of claim 1, wherein the first hydrogen-burning turbine engine is a main engine of an aircraft and the second hydrogen-burning engine is an auxiliary power unit engine of the aircraft.

6. The method of claim 1, wherein the fuel supply is a main fuel tank of an aircraft, and the valve is configured to selectively provide the liquid hydrogen of the main fuel tank to the first hydrogen-burning turbine engine and the second hydrogen-burning engine.

7. The method of claim 1, further comprising:

accumulating boil-off hydrogen from the fuel supply within an accumulator;

boosting a pressure of the boil-off hydrogen using a pump prior to the boil-off hydrogen being supplied into a starter tank; and using the pressure boosted boil-off hydrogen from the starter tank to start at least one of the first hydrogen-burning turbine engine and the second hydrogen-burning engine.

* * * * *